Dec. 29, 1964 E. R. DOAK ETAL 3,163,571
METHOD OF AND APPARATUS FOR MAKING
CORELESS, LAMINATED PROPELLERS
Filed Dec. 16, 1959 3 Sheets-Sheet 2
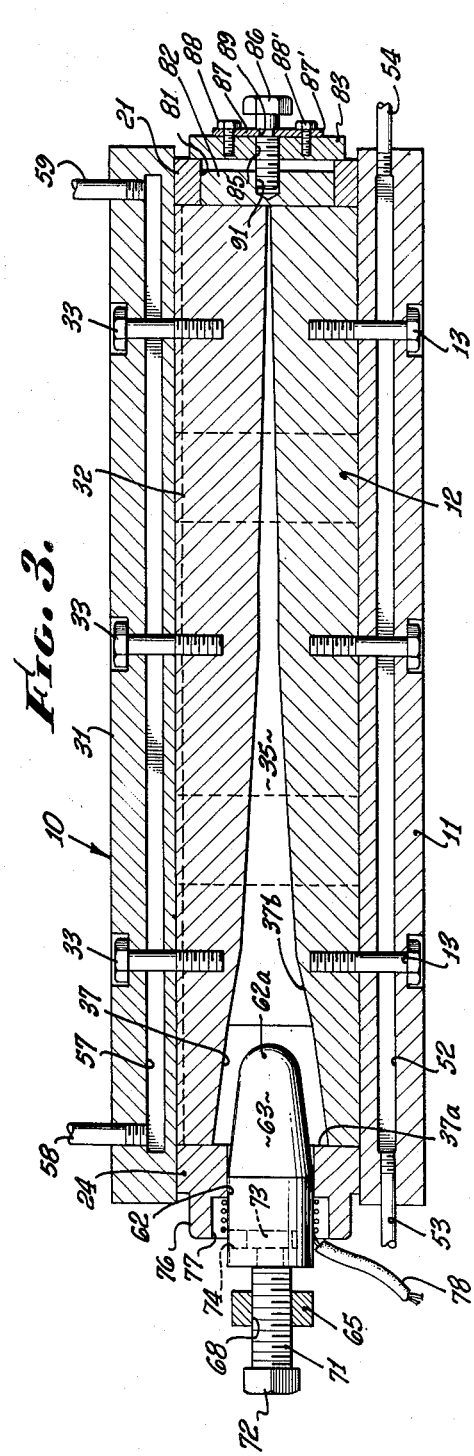
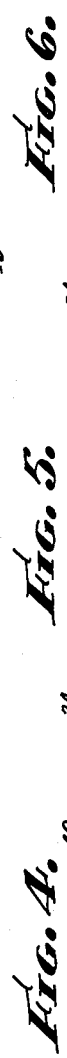
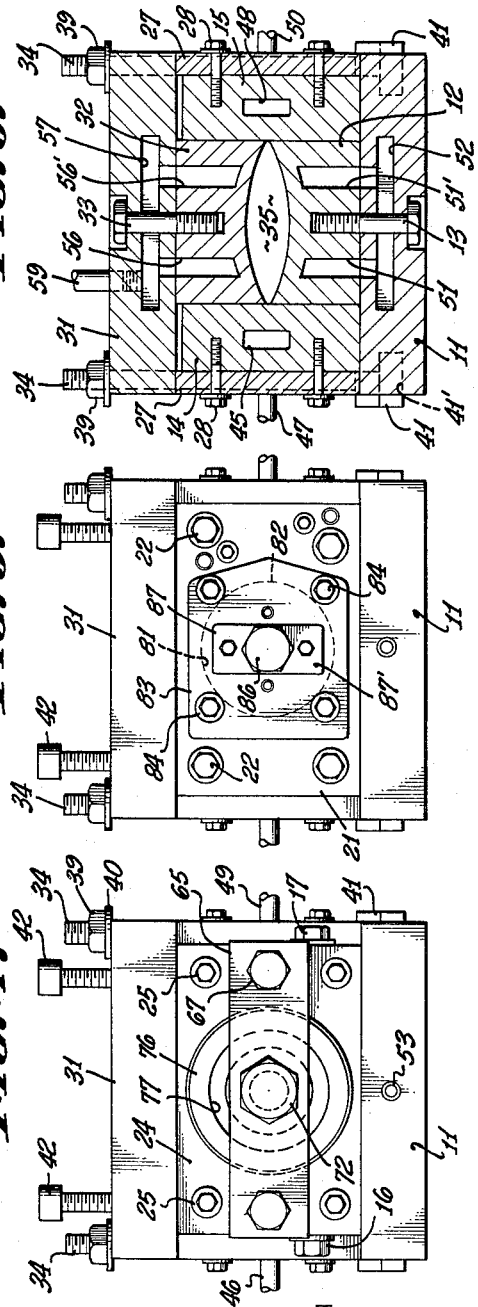
INVENTORS.
EDMUND R. DOAK
STACY G. MAXWELL
JAMES B. REICHERT
By Miketta and Glenny
ATTORNEYS.

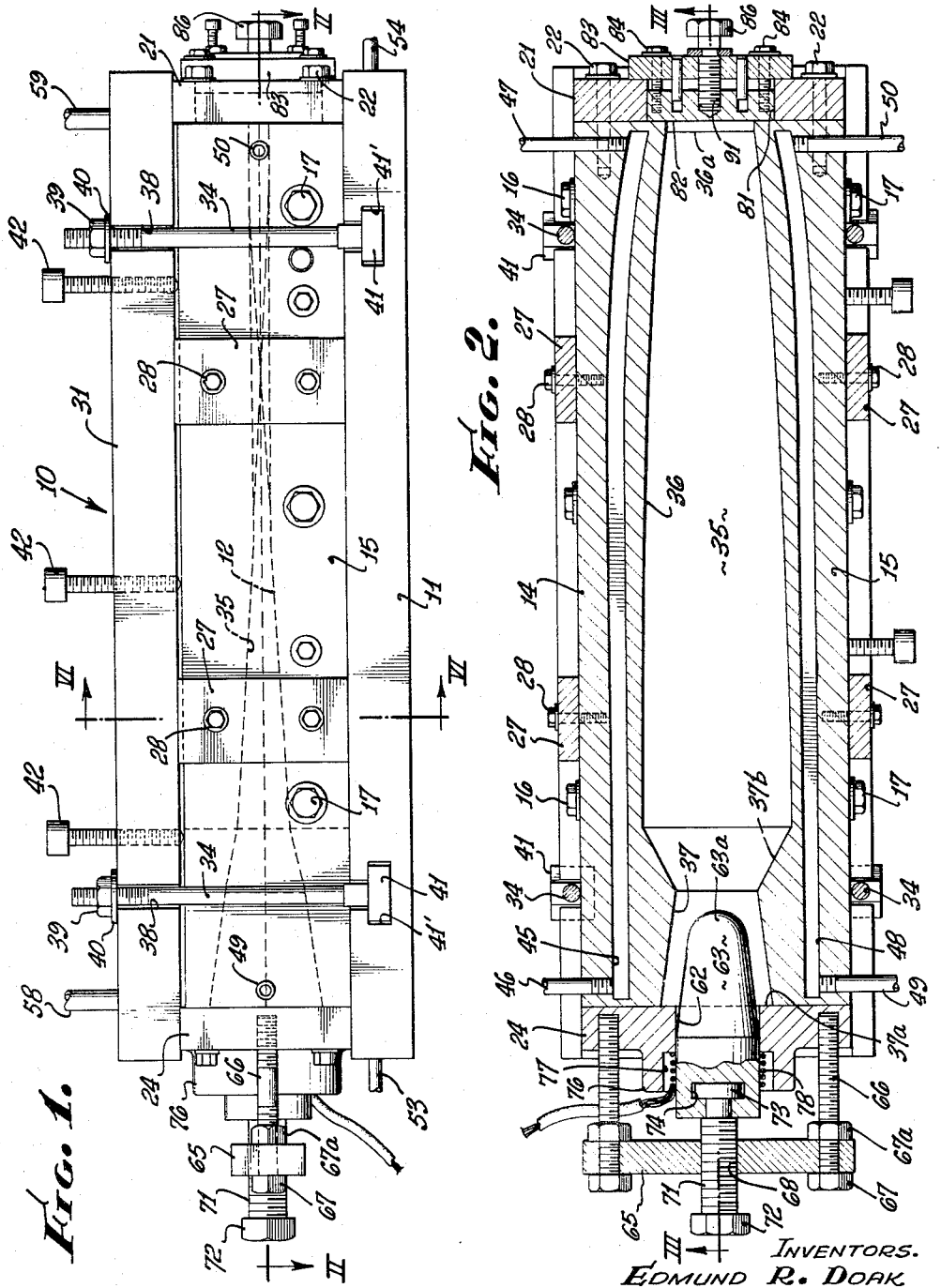

Dec. 29, 1964   E. R. DOAK ETAL   3,163,571
METHOD OF AND APPARATUS FOR MAKING
CORELESS, LAMINATED PROPELLERS
Filed Dec. 16, 1959   3 Sheets-Sheet 3
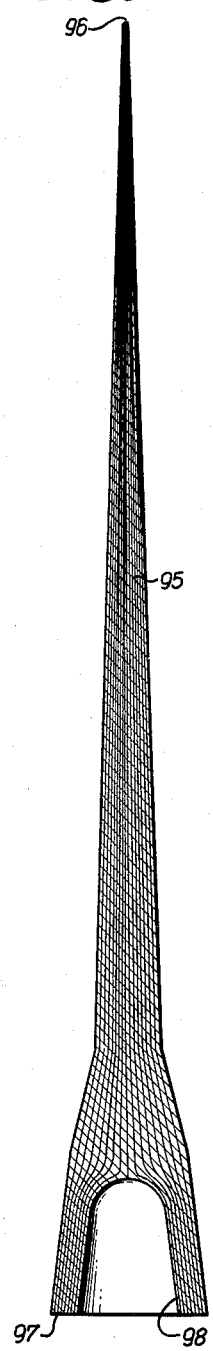
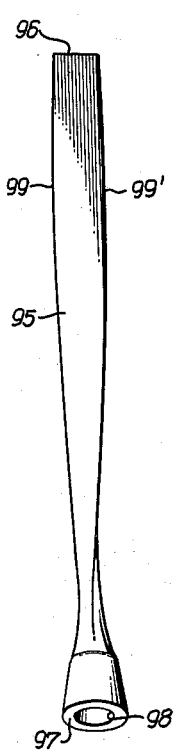
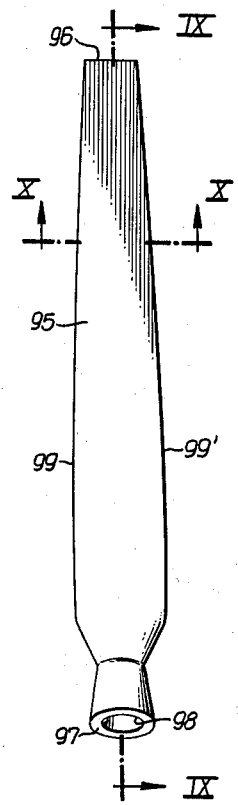
EDMOND R. DOAK
STACY G. MAXWELL
JAMES B. REICHERT
INVENTORS
BY
Miketta and Glenny
ATTORNEYS.

3,163,571
METHOD OF AND APPARATUS FOR MAKING CORELESS, LAMINATED PROPELLERS

Edmond R. Doak, Los Angeles, Stacy G. Maxwell, Redondo Beach, and James B. Reichert, Los Angeles, Calif., assignors, by mesne assignments, to Edmond R. Doak, Los Angeles, Calif.
Filed Dec. 16, 1959, Ser. No. 860,026
15 Claims. (Cl. 156—222)

The present invention relates to a method of an apparatus for making coreless, laminated propellers which are durable, free of stresses and strains and capable of maintaining their true shape at high rotational speeds. In particular, the present invention allows relatively large size, laminated propellers to be made with thick shank portions which are capable of being evenly cured and thus free of all stresses and strains.

Propellers are required to possess high tensile strength in order to resist the centrifugal forces and moments incurred during high rotational speeds. In addition to the material used, this is accomplished by having relatively thick shank portions and thin, tapered blade portions. In the past, propellers were made of a plurality of laminations of wood or sheets of metal. More recently, resin-impregnated layers of material were utilized by precutting the layers of impregnated material in the form of a finished propeller and laminating them together. In forming propellers with impregnated layers, only relatively small propellers could be made as the shank portions could not be too thick. If the shank portions were too thick, as in the case of large size propellers, the inner laminations would not completely cure, causing stresses and strains to exist, and the finished propellers would thus have weak shank portions. In addition, it was found that after heat and pressure were applied to the laminations, the material would soften and have a tendency to flow towards the thicker shank portion. This produced propellers having blade tip ends which were resin-rich or which were made of resin without any reinforcing material.

However, large size propellers are necessary in order to produce greater thrust. The present invention completely obviates the problems encountered heretofore in making laminated propellers of relatively large sizes. After the precut impregnated layers of material are assembled in the apparatus of the present invention, sufficient external heat and pressure are applied to liquefy the resin and to allow the precut material to assume the predetermined form of the completely enclosed propeller cavities in the apparatus. Then, internal heat and pressure are applied to the hub end of the shank portion of the layers of material to force the layers of material toward the blade tip end. At the same time, a hollow is formed within the shank portion of the layers of material providing relatively thin wall sections, which can be readily cured. In the present apparatus, this may be accomplished by providing a movable heater plunger on the hub end plate. The heater plunger is adapted to be selectively moved within the shank portion cavity of the apparatus to apply internal heat and pressure to the laminations.

Accordingly, it is a general object of the present invention to provide a method of and apparatus for making laminated propellers that avoid all of the foregoing disadvantages of similar type methods and apparatus used heretofore.

An object of the present invention is to provide a method of and apparatus for making propellers.

Another object is to provide a method of and apparatus for making relatively large size, laminated propellers free of all stresses and strains.

A further object is to provide a method of and apparatus for making stress-free, laminated propellers of large sizes by applying internal heat and pressure to the laminations forming the shank portion of the propeller and providing a hollow shank portion.

Other objects and advantages of this invention will be readily apparent from the following description when considered in connection with the appended drawings.

In the drawings:

FIG. 1 is a side elevation of an exemplary, assembled mold apparatus of the present invention.

FIG. 2 is a longitudinal section of the device taken along plane II—II of FIG. 1.

FIG. 3 is a longitudinal section of the device taken along plane III—III of FIG. 2.

FIG. 4 is a hub end view of the device in FIG. 1.

FIG. 5 is a tip end view of the device in FIG. 1.

FIG. 6 is a transverse section of the device taken along plane VI—VI of FIG. 1.

FIGS. 7 and 8 are perspective views of an exemplary propeller adapted to be made in the apparatus of FIGS. 1 to 6.

FIG. 9 is a longitudinal section of the propeller taken along plane IX—IX of FIG. 8.

FIG. 10 is a transverse section of the propeller taken along plane X—X of FIG. 8.

In the drawings, an assembled exemplary mold apparatus 10 is shown for making propellers in accordance with the present invention. A base plate 11 carries and is rigidly secured to a bottom plate 12 by means of a plurality of bolts 13 (FIG. 3). On either side of the bottom plate 12 and resting on the base plate 11, side plates 14 and 15 (FIG. 2) are provided and are rigidly secured to the bottom plate 12 by means of bolts 16 and 17, respectively.

A tip end plate 21 may be rigidly secured to the ends of side plates 14 and 15 by means of bolts 22. A hub end plate 24 may be carried on the base plate 11 and secured to the other ends of the side plates 14 and 15 by means of bolts 25. Longitudinally spaced on both sides of the base plate 11 may be provided vertical supports 27 which are rigidly secured to the side plates 14 and 15 by any suitable means, such as bolts 28.

In assembled position, as best seen in FIGS. 1 and 6, the side plates 14 and 15 are shorter in height than the tip end plate 21, hub end plate 24 and vertical supports 27. It is understood, however, that the tip end plate 21, hub end plate 24 and vertical supports 27 are all substantially of the same height so that there is a common horizontal plane connecting the upper ends of these elements.

A horizontally extending pressure plate 31 is adapted to be received and rest on the upper ends of the tip end plate 21, the hub end plate 24 and the vertical supports 27, and is not adapted to engage the upper ends of the side plates 14 and 15. Rigidly secured to and adapted to be carried by the pressure plate 31 is a top plate 32 secured thereto by any suitable means, such as bolts 33. In the assembled position, the top plate 32 is adapted to be received between the side plates 14 and 15, the tip end plate 21, the hub end plate 24 and to oppose the bottom plate 12. In the apparatus 10, the pressure plate 31 and the top plate 32 are not rigidly connected to any of the other plates forming the apparatus but are adapted to be removed for purposes to be described hereinafter.

The side, tip end, hub end, bottom and top plates described are provided with predetermined cavities cooperating to provide a completely enclosed propeller cavity 35 which includes a thin, tapered blade portion 36 having a tip end 36a, a substantially circular shank portion 37 having a hub end 37a, and a neck portion 37b communicating said shank portion 37 with the blade portion 36. It is understood that the cavities in each of the plates of the apparatus 10 may be designed so that they cooperate to form a propeller cavity 35 which will produce a propeller having any suitable pitch, suitable thicknesses, lengths, tapers, and diameters. In the propeller cavity 35, the walls of the plates of the apparatus may be designed so that the shank portion cavity 37 tapers toward the neck portion cavity 38.

By removing the pressure plate 31 and top plate 32, the propeller cavity 35 is exposed and is adapted to receive the material of which the finished propeller will be formed. An exemplary propeller adapted to be made in accordance with the present invention is shown as 95 in FIGS. 7, 8, 9 and 10. Such a propeller may include a tip end 96, hub end 97 having a shank cavity 98 therein, leading edge 99 and trailing edge 99'. While it is understood that the present invention is not limited to a specific material, it is preferred that resin-impregnated fiberglass material be used from which a plurality of layers are cut in accordance with the shape of the propeller cavity 35. An epoxy resin has been found to be suitable for the bonding material. The layers will vary in shape and in size according to the various thicknesses and tapers throughout the length of the finished propeller 95. It is preferred that when the precut layers are assembled within the cavity 35, the inner layers sequentially diminish in shape and size from the outer layers. The outer layers will then extend from one end of the propeller to the other end and from the leading edge 99 to the trailing edge 99', as best seen in FIGS. 9 and 10. Relatively large size propellers have been made where 90 layers of resin-impregnated fiberglass material were provided in the shank portion cavity and only 18 layers were provided at the tip end portion cavity 36a.

After the precut impregnated layers of material are inserted into the cavity 35, the top plate 32 and pressure plate 31 are reassembled on the apparatus 10 so that the top plate 32 engages the upper layers of material adapted to be placed in the cavity 35.

Any suitable means may be provided for applying uniform external pressure on the laminations adapted to be positioned in the propeller cavity 35. For example, elongated pressure-applying bolts 34 may be provided, each having a T-shaped head 41 receivable in complementary T-shaped slots 41' provided in the base plate 11. The upper ends of the bolts 34 are adapted to be received through slots 38 provided in the pressure plate 31 and selectively secured thereto by means of nuts 39 and washers 40. It can thus be understood that by selectively tightening the nuts 39 on the upper end of the pressure-applying bolts 34, the top plate 32 will be drawn downwardly towards the bottom plate 12 until the pressure plate 31 is bottomed or engages the upper ends of the hub end plate 24, the tip end plate 21 and the vertical supports 27. Suitable means such as elongated bolts 42, may be provided for loosening or removing the top plate 32 after the molding operation. Bolts 42 are threadedly received in the pressure plate 31 and their lower ends are adapted to engage the upper surfaces of the side plates 14 and 15 as best seen in FIG. 1.

Any suitable heating means may be provided for cooperating with plates of the apparatus 10 for applying uniform heat to the impregnated layers or laminations adapted to be positioned in the propeller cavity 35. For such purpose, suitable heating coils may be provided or the entire apparatus may be inserted into an oven. However, in the apparatus 10, suitable steam channels are provided in the plates so that controlled steam heat may pass through the channels and uniformly heat the laminations within the cavity 35. Side plate 14 may be provided with a steam chamber 45 having an inlet 46 and an outlet 47, and the side plate 15 may also be provided with a steam chamber 48 having an inlet 49 and an outlet 50. The bottom plate 12 may be provided with vertical, elongated heating channels 51 and 51' (FIG. 6) which communicate with a heating chamber 52 in the base plate 11. An inlet 53 and outlet 54 are provided in the base plate 11 and communicate with the heating chamber 52.

The top plate 32 may be provided with vertical, elongated heating channels 56 and 56' (FIG. 6) communicating with a chamber 57 provided in the pressure plate 31. An inlet 58 and outlet 59 are provided in the pressure plate 11 for providing steam heat to the heating chamber 57.

It can thus be understood that uniform external heat may be applied to the enclosed laminations within the cavity 35 by providing steam in the heating chambers and channels in the plates forming the apparatus 10.

While the plates of the mold apparatus 10 of the present invention may be made of any suitable, hardened steel material, it has been found that aluminum is suitable in that it has a higher heat conductivity.

After the precut, impregnated laminations are stacked within the cavity 35, the external heat applied through the steam chambers liquefies the impregnating bonding material and softens the precut fiberglass material. The material then assumes the shape of the mold cavity 35 and external pressure is then applied to the laminations by means of the bolts 34 and nuts 39. When the pressure plate 31 has been bottomed on the upper ends of the tip and end plates 21 and 24 and the vertical supports 27, the mold propeller cavity 35 is in the final shape or form for producing the finished propeller.

However, various difficulties and problems have been found in making propellers of relatively large sizes. For example, relatively large size propellers are required to have very thick shank portions. In apparatus used heretofore, the laminations within the thick shank portion were not evenly cured, thus providing a weak shank for the propeller. In addition, when the external pressure was being applied to the softened laminations, the liquefied resin and softened laminations had a tendency to flow towards the thicker part of the propeller cavity, namely, the shank portion cavity 37.

These problems are completely obviated in the present invention by providing means longitudinally and movably carried by the hub end plate 24 for providing axial internal heat and pressure to the laminations within the completely enclosed propeller cavity 35. The hub end plate 24 may be provided with a central opening 62 for slidably receiving an elongated plunger 63 movably carried on the hub end plate 24 and having a free end 63a movable into the shank portion cavity 37. The free end 63a of the plunger 63 may have surfaces substantially parallel to and spaced from the walls of the shank portion cavity 37 and is movable along the axis of the shank portion cavity.

Selectively operable means may be provided for moving the plunger 63 into the shank portion cavity 37 for applying heat and internal pressure to the laminations within the propeller cavity 35. A stationary support 65 may be spaced from and rigidly connected to the hub end plate 24 by means of bolts 66 having nuts 67 and 67a on either side of the support 65. A central opening 68 within the support 65 may threadedly receive a screw 71 having a hexagonal cap 72 on its outer end and secured to the plunger 63 at its inner end by any suitable means. As shown in FIGS. 2 and 3, the inner end of the screw 71 has a radial extension 73 adapted to be slidingly received within a complementary slot 74 within the plunger 63. By rotating the screw 71, it can thus be understood that the plunger 63 may have its inner free end 63a selectively positioned within the shank portion cavity 37 or moved outwardly so that the free end 63a is substantially withdrawn from the shank portion cavity 37.

Plunger heating means may be connected to the heater plunger 63 for providing heat to the movable free end of the plunger 63a. As shown, a boss portion 76 may be provided on the outside of the hub end plate 24 and may have a hollow 77 surrounding the central opening 62. A heating coil 78 may be slidingly wrapped around the plunger 63 and positioned within the hollow 77 in the outer boss 76. Controlled heat may be applied to the heating coil 78 so that the inner free end 63a may apply internal heat to the laminations provided within the hub portion cavity and evenly cure all of the resin provided therein.

It can thus be understood that when the plunger 63 has been moved inwardly into the shank portion cavity 37, as shown in FIGS. 2 and 3, a hollow will be provided within the shank of the finished propeller. The shank of the finished propeller will thus have thinner wall sections and will be easily curable to eliminate any stresses or strains. In addition, the plunger 63 applies internal pressure to the laminations and the liquefied resin throughout the completely enclosed propeller cavity 35.

After the external heat and pressure have been applied to the laminations, as explained hereinabove, the plunger 63 is selectively moved inwardly creating internal pressure by the medium of the liquefied resin. This fluid pressure forces the fiberglass material towards the tip end portion cavity 36a and also causes the material to be forced against the inner walls of the plates forming the cavity 35. This completely eliminates the possibility of producing propellers having a resin-rich tip end without having any fiberglass material therein.

The amount of heat and pressure required to form a propeller utilizing the present invention may vary, dependent upon many factors. For example, the impregnated material used for the precut laminations of the propeller rarely is made with the same amount of impregnating material thereon. Due to the drying operation, the impregnated material may have more or less bonding material thereon than a previous batch used. Therefore, if there is excessive liquefied resin within the propeller cavity, the plunger 63 is not required to be inserted within the shank portion cavity 37 as far as if there is less impregnated material on the precut laminations.

However, it has been found that due to the excessive bonding and impregating material which may be provided on the laminations, it is desirable to provide some means for draining excessive liquefied resin in order to produce a better propeller. The tip end plate 21 is therefore provided with a central opening 81 for slidably receiving a tip end plate portion 82 adapted to close the tip end portion cavity 36a of the propeller cavity 35. The plate portion 82 may be provided with selectively adjustable means for moving it with respect to the bottom, top and side plates and for allowing it to be gapped for leakage of excessive bonding material for the limitations. A stationary supporting plate 83 may be connected to the end plate 21 by means of bolts 84 and provided with a central opening 85. A bolt 86 may be rotatably received within the opening 85 and rotatably mounted on the supporting plate 83 by means of a pair of transverse strips 87 and 87' being rigidly secured to the supporting plate 83 by means of bolts 88 and 88', respectively. The inner ends of the transverse strips 87 and 87' are adapted to rotatably engage an annular cutout portion 89 provided in the bolt 86 to allow the bolt 86 to rotate but prevent it from moving longitudinally with respect to the supporting plate 83. The inner end of the bolt 86 is threadedly received in a threaded opening 91 centrally provided in the tip end plate portion 82. It can thus be understood that the bolt 86 is adapted to move the tip end plate portion 82 inwardly and outwardly with respect to the top, bottom and side plates. This is adapted to provide a gap to allow excessive liquid resin to be drained out of the propeller cavity 35 during the forming operation. This excessive resin can be easily machined off after the finshed propeller is cured.

In the operation of the apparatus 10 described hereinabove, it is preferred that the bottom, sides, tip end and hub end plates remain in an assembled position, and the top plate and pressure plate are adapted to be removed after the forming of a propeller. When the top plate 32 has been removed, the precut, impregnated laminations are inserted into the propeller cavity and the top plate 32 is repositioned on the apparatus. The top plate 32 and pressure plate 31 are adapted to be moved downwardly into snug engagement with the stacked laminations. This may be done either by hand or by means of the pressure-applying bolts 34. In some instances, it may be necessary to apply additional pressure by means of a press or the like order to move the pressure plate downwardly so that the bolts 34 may be then used to apply additional pressure. External heat is then applied to the laminations by means of steam being provided to the various steam chambers within the plates of the apparatus. After the impregnating material has been liquefied and the fiberglass material softened, the pressure plate and top plate are forced downwardly into the bottomed position by means of the bolts 34. The plunger 63 is then adapted to be selectively moved inwardly to apply internal heat and pressure to the laminations within the propeller cavity 35.

In actual practice, it has been found that the external heat applied to the laminations is approximately between 250° F. to 350° F. and the external pressure applied thereto is between 300 to 425 p.s.i. The internal heat and pressure applied by means of the heater plunger 63 has been found to be approximately 250° F. to 350° F. and 300 to 600 p.s.i., respectively. It has been noted during the the forming operation that sufficient pressure has usually been exerted by means of the plunger 63 when the pressure plate 31 starts to rise off of the upper ends of the vertical supports 27.

As stated hereinabove, it may be desirable to gap the tip end portion 82 so that excessive resin may be drained from the propeller cavity 35. This step is entirely within the discretion of the operators of the apparatus, in view of the amount of resin on the impregnated material. The internal and external heat are then applied and the layers of material forming the propeller are allowed to cure to form a strong, homogeneous propeller free of all stresses and strains. This curing step may comprise reheating the layers within an oven to approximately 325° F. to 375° F. for approximately one hour to an hour and fifteen minutes. With the internal and external pressures still being applied to the laminations, the laminations are allowed to cool. This may be quickly and easily accomplished by forcing cold water through the chambers and channels used for conducting the steam heat.

It can thus be understood that the present invention provides a method of making a lightweight, homogeneous propeller which does not require an inner core, as is usually found in similar type propellers. This method comprises the steps of assembling impregnated, preformed layers of material into the predetermined form of the finished propeller, applying sufficient external heat and pressure to the assembled layers to liquefy the resin and cause the material to assume the form of the finished propeller, applying sufficient internal heat and pressure to the hub end of the layers to form a hollow in the shank portions and to force the liquefied resin and layers of material toward the thin, tapered blade portion while the exteral heat and pressure are being applied, removing the internal and external heat, and curing the layers.

It can therefore be understood that the present invention provides a method and apparatus which completely eliminates the difficulties encountered heretofore in making blades of relatively large sizes. The movable plunger adapted to be received within the shank portion cavity provides sufficient internal heat and pressure to the laminations to prevent internal stresses and strains from existing in the shank of the finished propeller, and also forces the liquefied resin and the material towards the tip end portion cavity. This insures a finished propeller having a strong tip end which is not resin-rich.

Obviously many modifications and variations of the present invention are possible in the light of the above teachings. It is therefore to be understood that within the scope of the appended claims the invention may be practiced otherwise than as specifically described.

We claim:

1. A method of making a lightweight, coreless, homogeneous propeller, comprising the steps of: forming layers of resin-impregnated material into diminishing shapes and sizes corresponding to a predetermined form of a finished propeller having a thin, tapered blade portion terminating in a tip end, a thick shank portion terminating in a hub end, and a neck portion connecting said shank and blade portions; assembling and completely enclosing said impregnated, preformed layers into the predetermined form of the finished propeller with the inner layers sequentially diminishing in shape and size from the outer layers; applying sufficient external heat and pressure to said enclosed layers of resin-impregnated material to liquefy the resin and cause the material to assume the form of the finished propeller; applying sufficient axial internal heat and pressure to the hub end of said layers to form a hollow in the shank portion and to force the liquefied resin and layers of material toward the thin tapered blade portion while external heat and pressure are being applied; and curing said layers of material to form a strong, homogeneous propeller free of all stresses and strains.

2. A method of making a propeller as stated in claim 1 wherein the layers of preformed materials are assembled substantially parallel to the chord of the finished propeller.

3. A method of making a lightweight, coreless, homogeneous propeller, comprising the steps of: forming layers of resin-impregnated material into diminishing shapes and sizes corresponding to a predetermined form of a finished propeller having a thin, tapered blade portion terminating in a tip end, a thick shank portion terminating in a hub end, and a neck portion connecting said shank and blade portions; assembling and completely enclosing said impregnated, preformed layers into the predetermined form of the finished propeller with the inner layers sequentially diminishing in shape and size from the outer layers; applying sufficient external heat and pressure to said layers of resin-impregnated material to liquefy the resin and cause the materials to assume the form of a finished propeller; applying sufficient internal heat and pressure to the hub end of said layers in the shank portion to force the liquefied resin and layers of material toward the thin tapered blade portion while external heat and pressure are being applied; curing said layers of material; and cooling said layers to form a strong, homogeneous propeller free of all stresses and strains.

4. A method of making a lightweight, coreless, homogeneous propeller, comprising the steps of: forming layers of resin-impregnated fibrous material into diminishing shapes and sizes corresponding to a predetermined form of a finished propeller having a thin, tapered blade portion terminating in a tip end, a thick shank portion terminating in a hub end, and a neck portion connecting said shank and blade portions; assembling and completely enclosing said impregnated preformed layers into the predetermined form of the finished propeller with the inner layers sequentially diminishing in shape and size from the outer layers, the outer layers extending from the leading edge to the trailing edge and the hub end to the tip end, the layers being substantially parallel to the chord of the finished propeller, and the fibers of the material extending longitudinally of the propeller; applying sufficient external heat and pressure to said layers of resin-impregnated material to liquefy the resin and cause the materials to assume the form of the finished propeller; applying sufficient internal heat and pressure to the hub end of said layers to form a hollow in the shank portion and to force the liquefied resin in layers of material toward the thin, tapered blade portion while external heat and pressure are being applied; and curing said layers of material to form a strong, homogeneous propeller free of all stresses and strains.

5. A method of making a lightweight, coreless, homogeneous propeller, comprising the steps of: applying sufficient external heat and pressure to completely enclosed layers of resin-impregnated material of diminishing shapes and sizes corresponding to the form of a finished propeller having a thin, tapered blade portion terminating in a tip end, a thick shank portion terminating in a hub end, and a neck portion connecting said shank and blade portions to liquefy the resin and cause the materials to assume the form of the finished propeller; applying sufficient internal heat and pressure to the hub end of said completely enclosed layers in the shank portion to force the liquefied resin in layers of material toward the thin, tapered blade portion while external heat and pressure are being applied; and curing said layers of material to form a strong, homogeneous propeller free of all stresses and strains.

6. A method of making a propeller as stated in claim 5 wherein said external heat and pressure applied are approximately 250° F. to 350° F. and 300 to 425 p.s.i., respectively; said internal heat and pressure applied are approximately 250° F. to 350° F. and 300 to 600 p.s.i., respectively; and said curing step comprises heating said layers to approximately 325° F. to 375° F.

7. In a mold apparatus for making laminated propellers, the provision of: bottom, top, hub end, tip end and side plates having predetermined cavities cooperating to provide a propeller cavity which includes a thin, tapered blade portion having a tip end, a substantially circular shank portion having a hub end, and a neck portion communicating said shank portion with said blade portion; means movably carried by said hub end plate for providing axial interval heat and pressure to the laminations adapted to be positioned within the propeller cavity; means cooperating with said plates for applying uniform external pressure on the laminations adapted to be positioned in said propeller cavity; and means cooperating with said plates for applying uniform external heat to the laminations adapted to be positioned in said propeller cavity.

8. In a mold apparatus as stated in claim 7, the provision of: selectively adjustable means for movably mounting said tip end plate with respect to said bottom, top and side plates for allowing the tip end plate to be selectively gapped for leakage of excess bonding material for the laminations.

9. In a mold apparatus as stated in claim 7, wherein said internal heat and pressure means includes an elongated plunger movably carried on said hub end plate and having a free end movable into said shank portion cavity, the free end of said plunger having surfaces substantially parallel to and spaced from the walls of said shank portion cavity and movable along the axis of said shank portion cavity; selectively operable means for moving said plunger into said shank portion cavity for applying axial internal pressure to and forming a hollow within the laminations in the propeller cavity; and plunger heating means connected to said plunger for providing heat to the movable free end of the plunger adapted to be positioned within the shank portion cavity.

10. In a mold apparatus for making laminated propellers, the provisions of: bottom, top, hub end, tip end and side plates having predetermined cavities cooperating to provide a propeller cavity which includes a thin, tapered blade portion having a tip end, a substantially circular shank portion having a hub end, and a neck portion communicating said shank portion with said blade portion, the walls of said shank portion cavity tapering toward said neck portion cavity; an elongated plunger movably carried on said hub end plate and having a free end movable into said shank portion cavity, the free end of said plunger having surfaces substantially parallel to and spaced from the walls of said shank portion cavity and movable along the axis of said shank portion cavity; selectively operable means for moving said plunger into said shank portion cavity for applying axial internal pressure to and forming a hollow within the laminations in the propeller cavity; means cooperating with said plates for applying uniform external pressure on the laminations adapted to be positioned in said propeller cavity; means cooperating with said plates for applying uniform external heat to the laminations adapted to be positioned in said propeller cavity; and plunger heating means connected to said plunger for providing heat to the movable free end of the plunger adapted to be positioned within the shank portion cavity.

11. In a mold apparatus as stated in claim 10, the provision of: selectively adjustable means for movably mounting said tip end plate with respect to said bottom, top and side plates for allowing the tip end plate to be selectively gapped for leakage of excess bonding material for the laminations.

12. In a mold apparatus for making laminated propellers, the provision of: bottom, top, hub end, tip end and side plates having predetermined cavities cooperating to provide a propeller cavity which includes a thin, tapered blade portion having a tip end, a substantially circular shank portion having a hub end, and a neck portion communicating said shank portion with said blade portion; and means movably carried by said hub end plate for providing axial internal heat and pressure to the laminations adapted to be positioned within the propeller cavity for forcing the laminations toward the tip end while external heat and pressure are being applied.

13. In a mold apparatus as stated in claim 12, wherein said internal heat and pressure means includes an elongated plunger movably carried on said hub end plate and having a free end movable into said shank portion cavity.

14. In a mold apparatus for making propellers, the provision of: bottom, top, hub end, tip end and side plates having predetermined cavities cooperating to provide a propeller cavity which includes a thin, tapered blade portion having a tip end, a substantially circular shank portion having a hub end, and a neck portion communicating said shank portion with said blade portion; and selectively adjustable means for movably mounting said tip end plate with respect to said bottom, top and side plates for allowing the tip end plate to be selectively gapped for leakage of excess bonding material for the laminations.

15. In a mold apparatus as stated in claim 14, the provision of: means movably carried by said hub end plate for providing internal heat and pressure to the laminations adapted to be positioned within the propeller cavity.

References Cited in the file of this patent

UNITED STATES PATENTS

| | | |
|---|---|---|
| 1,475,623 | Egerton | Nov. 27, 1923 |
| 1,485,061 | Ahlgren | Feb. 26, 1924 |
| 2,796,215 | Warnken | June 18, 1957 |
| 2,934,317 | Warnken | Apr. 26, 1960 |
| 2,967,796 | Raffel | Jan. 10, 1961 |